United States Patent [19]
Murphy

[11] 3,906,583
[45] Sept. 23, 1975

[54] WINDSHIELD CLEANING DEVICE

[76] Inventor: Patrick W. Murphy, 126 Dunlop Ave., Tonawanda, N.Y. 14150

[22] Filed: Dec. 12, 1973

[21] Appl. No.: 424,052

[52] U.S. Cl............................. 15/250.03; 15/250.41
[51] Int. Cl. .............................................. B60s 1/02
[58] Field of Search....... 15/250.03, 250.04, 250.08, 15/250.1, 250.11, 250.37, 250.4, 250.01, 250.02

[56] References Cited
UNITED STATES PATENTS

| | | | |
|---|---|---|---|
| 1,845,782 | 2/1932 | Brazee | 15/250.03 |
| 1,919,236 | 7/1933 | Lunsford | 15/250.03 |
| 2,050,920 | 8/1936 | Bujnicki | 15/250.03 |
| 2,416,572 | 2/1947 | Cordova | 15/250.08 |
| 2,689,369 | 9/1954 | Biek | 15/250.41 X |
| 2,891,270 | 6/1959 | Reiter | 15/209 R X |
| 3,631,561 | 1/1972 | Aszkenas | 15/250.41 |
| 3,636,582 | 1/1972 | Wright | 15/250.03 |

Primary Examiner—Peter Feldman
Attorney, Agent, or Firm—Raymond F. Kramer

[57] ABSTRACT

A windshield cleaning device for attachment to a windshield wiper blade includes a cleaning member which is conformable to the surface of a windshield, such as an automobile windshield. The cleaning member is preferably tubular and is provided with a surface such as a sponge, cellular plastic or plastic mesh, suitable for scrubbing dirt, insect spatterings, and the like from the surface of a windshield. The cleaning tube, adapted to be held by arms inserted at each end and mountable on a wiper blade, can be rotated periodically to provide fresh cleaning surfaces and, in some embodiments, may be flushed clean by reverse flowing of water through it. The tubular cleaning element can be conveniently cut to any length to adapt it to a variety of blade sizes.

12 Claims, 2 Drawing Figures

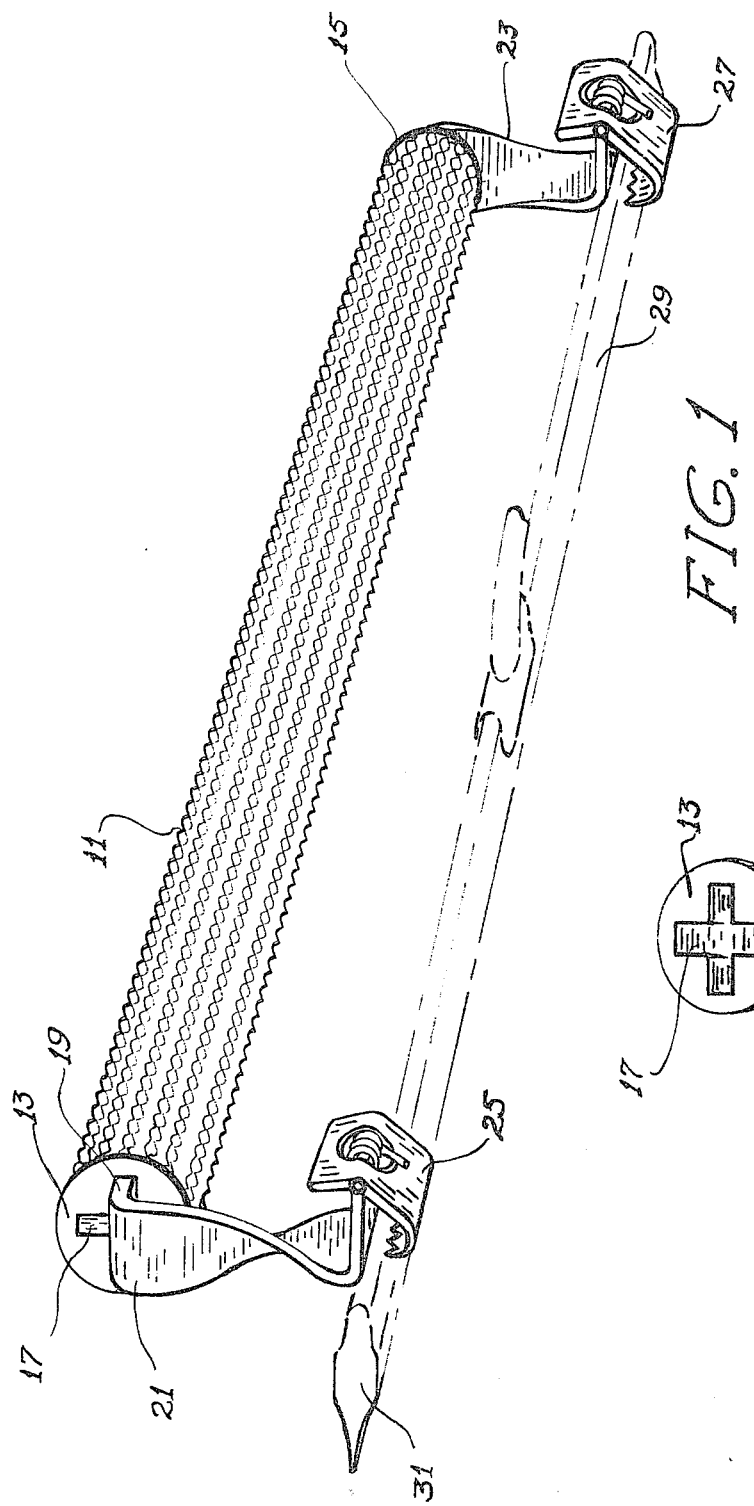

WINDSHIELD CLEANING DEVICE

This invention relates to a windshield cleaning device for attachment to windshield wiper blades. More particularly, it relates to a supplementing cleaning tube adapted to scrub insect spatterings and hard to remove deposits off windshields.

The usual windshield wiper, designed for use on the windshields of cars, trucks, boats and other vehicles, provides an effective means for removing water from the windshield. Conventional windshield wipers are frequently supplemented with windshield sprayer units, by means of which a stream or spray of water or solvent can be applied to the windshield during wiper operation to assist in the removal of dirt. However, even with the use of such a spray unit, conventional windshield wipers are of minimal effectiveness in the removal of strongly adherent dirt and deposits. This is especially so with regard to the resins from insect spatterings and the like which commonly accummulate on vehicular windshields and obscure the driver's vision. Such stains or coatings usually are removed by hand rubbing or scrubbing with a sponge or pad after the vehicle has been stopped.

It is a major object of the present invention to provide a windshield cleaning device which may be conveniently attached to a conventional vehicular windshield wiper blade to augment the cleaning action of the blade.

It is another object to provide a windshield wiper attachment which will supplement the wiping action of the wiper blade with the addition of a scouring or scrubbing action to effectively aid in the removal of difficultly removable stains or spots, such as insect residues and the like.

It is a further object to provide a windshield cleaning device which will effectively augment the cleaning action of windshield wiper blades, squeegee blades and the like, which is inexpensive to manufacture, simple to install as an attachment on windshield wiper blades, squeegee blades and the like, easily changeable in position to present cleaner cleaning surfaces when needed, and readily adaptable in length to fit various size wiper blades.

Other objects, advantages and features of the present invention will become apparent to those skilled in the art from the following description, taken in conjunction with the drawing, wherein:

FIG. 1 is a perspective view of an embodiment of the windshield cleaning device of the present invention, shown attached to a windshield wiper blade; and FIG. 2 is a perspective view of a terminal adapter, which, in accordance with one embodiment of the present invention, is appropriately sized and shaped to be inserted into an open end of the tubular portion of the device in the manner illustrated in FIG. 1.

Referring now with more specific detail to the drawings:

The windshield cleaning device of the present invention, as shown in the embodiment illustrated in FIG. 1, comprises a tubular cleaning element 11; terminal adapters 13 and 15, both of which have end openings and the former of which is shown as having an opening 17; which openings hold arms 21 and 23, as at end 19 of arm 21; and clamping or attaching means 25 and 27.

The tubular cleaning element 11 is a resilient, flexible tube, conformable to the surface of a window or windshield. The inner portions of the ends of the tubular element are shaped to receive or engage terminal adapters 13 and 15 in pressure fits. The adapters are constructed with an opening as at 17, into which one end of a holding arm, such as end 19 of arm 21, is inserted. At the other end of holding arms 21 and 23 clamping means 25 and 27, respectively, are provided. The clamping means, as shown in the figure, are attached to the back or spine 29 of windshield wiper blade 31.

FIG. 2 illustrates the construction of terminal adapter member 13 (and similar member 15) in greater detail. The adapter is appropriately proportioned so as to provide a pressure fit, that is, to frictionally engage with or hold to the end of the tubular cleaning element 11 when inserted therein. Although the adapter illustrated in this view is generally cylindrical in shape, it will be appreciated that other shapes may be employed provided the adapter fits into the tubular element tightly enough to prevent the tube from rotating or slipping with respect to the adapter when the holding arms are in place and the wiper blade and attachment are in motion. Instead of being of cylindrical shape, the end adapter may be tapered in a manner similar to the tapering of many corks or rubber stoppers so as to provide a tight fitting plug, even when the inside diameter of the tubular element varies slightly. Furthermore, the tubular cleaning element may be constructed with various other shapes on the inside surface, provided the adapter is shaped in such a manner as to provide an appropriately tight frictional hold or other secure holding means. Thus, to securely engage the tubular element when placed in the ends thereof, the terminal plug may be circular, oval, star-shaped, triangular, square, rectangular, hexagonal or of other cross-sectional shape depending on the inside shape of the tubular element, and it may be tapered fluted, smooth or irregular to promote fitting. Alternatively, the terminal adapter may be threaded or ridged so as to mate with internal threads or ridges in the interior of the tubular cleaning element. It may also be fastened thereto by spring or catch means or similar mechanical device, or may be fused, adhered or cemented to the tube or otherwise held to it.

Furthermore, although the illustrations and descriptions hereinabove depict an embodiment wherein the terminal adapter member 13 serves as a plug or male component to be joined to the tubular element, the latter serving as the female component, the reverse of such an arrangement is also within the invention. Thus, the end of the tubular cleaning element may serve as a male component to be inserted into a terminal adapter in the form of a cap. In this case the outside diameter of the tubular cleaning element is reduced sufficiently so that when a terminal cap is in place, the overall end diameter is less than the diameter of the rest of the cleaning element in order not to interfere with or prevent the surface of the main portion of the tubular cleaning element from effectively contacting the windshield surface during operation. The terminal adapter may be formed from any of a variety of substances, including, for example rubber, plastic, metal, fiber, wood or other construction material.

The terminal adapter member 13 is provided with an opening which receives arm member 21. In the embodiment illustrated in the drawings, the opening 17 is cruciform in cross-section, in the shape of two crossed slots, each slot being of appropriate size and shape to receive the end 19 of the holding arm 21. Arms 21 and 23 are mirror images of each other and inserts 13 and 15 are positioned so that the slots thereof and arms inserted in them are aligned.

It will be apparent that the provision of two slots in the end member is not limitative and that a single slot would be sufficient to engage the holding arm. However, with the provision of two or more slots, an important advantage is obtained. The tube may then be placed in the holding arms in any of four axial positions instead of in either of two such positions. Thus, after the tubular cleaning element has been in use in one position long enough to wear the cleaning surface or cause deposits of dirt or resins thereon as a result of repeated scrubbing actions against the windshield, it may be changed by rotating to a new position to provide a fresh cleaning surface, by merely loosening the holding arms and rotating the tube to engage the holding arms in a new slot position. In this manner, four different cleaning surface sections may be used during the lifetime of the tubular cleaning element. It will be appreciated that a greater number of slots may be provided, affording an even greater number of cleaning surfaces. Furthermore, a variety of other shapes may be employed as the terminal openings. For example, a square, hexagon or other shaped opening may be similarly employed, provided that a conformable shape is provided for the insertable end of the holding arm. In addition, although the illustrations depict an embodiment wherein the terminal member provides a female type fitting to be engaged by a male fitting on the holding arm, the reverse of this arrangement is also within the invention and engagements may be effected by other known holding means, e.g., clamps, cements, friction fits and ties. The terminal member may be constructed with a protrusion which may be engaged in an appropriately shaped socket or opening in the holding arm or the holding arm may have points thereon adapted to pierce and hold onto the adapter or tube.

The holding arms 21 and 23 may be of any of a variety of forms provided that they are adapted at an end to hold the tubular cleaning element by engaging the adapter member and at another end to attach to the back or spine of a wiper blade. In the embodiment illustrated, the holding arm is in the form of a bar or strap having a half twist to provide tension on the tube, causing it to be pressed downwardly against a window or windshield surface, thereby increasing the effectiveness of the scrubbing action. A holding arm such as that shown in FIG. 1 at 21 may be conveniently fabricated for example, from one-sixteenth inch by one-half inch stainless steel band. A variety of other materials can be employed in the fabrication of the holding arm, including, for example, metals, such as brass, spring steel, aluminum, magnesium, chrome plated steel, nickel plated steel, various alloys and the like, as well as non-metals, such as the synthetic organic plastics. A particular advantage with respect to the vehicle operator's vision may be obtained through the use of a transparent plastic such as an acrylic, amide (e.g., nylon), polystyrene or polycarbonate. "Clear", translucent or opaque polymers may also be used, e.g., polypropylene, polyesters and phenolic resins and the various polymers may be reinforced, as by glass fibers, as is known in the plastics art.

The holding arm may be attached to a windshield wiper blade by means of spring clamps 25 and 27, as shown in FIG. 1. Alternatively, other attaching means, such as pressure fits, set screws, nuts and bolts, threaded clamps or other positive holding devices which grip the wiper spine or body and hold to it tightly, may be used.

If desired, the tubular cleaning elements may be attached to both sides of a wiper blade to provide a scrubbing action on a windshield section before the wiping action of the blade, regardless of the direction the wiper blade is traveling. Also, the cleaning element may be so affixed to the blade or blade spine as to have the wiper follow it on return to rest or storage position so as to wipe the windshield clean for storage of the wiper. Although it is intended that the cleaning device should be removed from the wiper when not being used it can be left in position on the wiper. When the arms are bent away so as to hold it from contact with the windshield, the wiper may be used without the scrubber.

The tubular element 11 may be fabricated from a variety of well-known materials which will effect the desired scrubbing action when the element is rubbed across a windshield surface. The material will be softer than the material of the windshield to avoid scratching. The tubular cleaning element may, for example, be formed of a resilient material such as sponge or a cellular plastic and may be overlaid or covered with a plastic mesh such as a nylon mesh to aid in the scrubbing action. The tubular element should be sufficiently strong to maintain a substantially straight tubular shape and yet should be sufficiently flexible and resilient to be conformable to the surface of a windshield having a moderately curved surface without becoming permanently misshapen. The tubular element may be formed from tubes of rubber or plastic, cellular plastic, sponge, plastic mesh or the like, which may be supported on the inside by a metal or plastic tube. Other materials having the necessary properties of strength and flexibility include, for example, rigid polyurethane and polystyrene foams for the base of the tube and flexible polyurethane foam about the base and making contact with the windshield. The base portion may be adapted to be held directly by the terminal members and the foam may be wrapped around it and cemented or fused together at the ends thereof and/or to the base. If desired, the plastic mesh, e.g., nylon or polypropylene mesh, like that of a plastic pot scouring pad, such as the tube surface in FIG. 1, may be formed into a confining tube and may be sealed about the foam or sponge to hold it in place while providing a scouring surface. Thus, the base provides a support while the sponge or foam gives resiliency and the mesh helps to "scour" off hard to remove deposits. The mesh or outer portion of the cleaning tube may be of any of a variety of hardnesses, as desired, to effect the best abrading or scrubbing action for the particular types of windshields used and the windshield deposits encountered.

The length of the tubular element will vary depending on the size of the windshield and wiper blade to which it is to be applied. Normally, it will be from ten inches to eighteen inches. The diameter or thickness of the tube is not critical but will generally be between about ¼ inch and 2 inches, preferably being from ½ inch to 1 inch.

From the foregoing description it will be seen that the windshield cleaning device of the present invention preferably comprises three types of elements: a tubular cleaning element, two terminal members, and two holding arms. The construction described offers a further important advantage in the manufacture and installation of the device. Since vehicular windshields and windshield wiper blades vary in size, ranging for example, from the sizes required on large buses and trucks to small automobiles, the present windshield cleaning device is preferably available in a similar range of sizes. With the three element construction hereinabove described, the tubular cleaning element may be manufactured in a length sufficient to match the largest size wiper blades and may easily be cut to a smaller length at the time and place of installation. Thus, at the time of installation, the tubular cleaning element may simply be cut to the desired size, the terminal members and holding arms installed and the device clamped to the wiper blade. As a result the manufacturer and installer are relieved of the expense and inconvenience of manufacturing and stocking a large variety of sizes. Similarly, the arms may be bent to adapt them to fitting best onto various wiper blades and to exerting the desired pressure on the windshield. If desired, one end of the cleaning element may be premolded to fit the associated arm and only the other end may have an adapter fitted onto it. Alternatively, the entire tube, both end portions or one end portion and several inches at the other end may be adapted to have the arms fit them. Thus, to fit the tube to a small wiper one would cut off part of an end, leaving enough to provide a fitting opening at each end for the arms. Such arms can have the ends thereof serrated, jagged or roughened to hold better to the cleaning element. Of course, solid tubes can be used, with desired cruciform or other fitting passageways molded into them. The holding arms may be bent to release the cleaning tube or to hold it more tightly or to adjust its pressure against the windshield. The entire cleaning device is readily removable from the wiper when no longer needed.

The cleaning member is preferably porous or permeable, rather than solid, since it is found that such constructions improve cleaning properties. Thus, backwashing is facilitated to remove dirt from the unit. If the cleaner is connected to a source of cleaning fluid, the fluid can be injected into the tube during use to promote better flushing of the unit and cleaning of the windshield.

It will be apparent to those skilled in the art that many variations and modifications, as hereinabove set forth, may be made without departing from the spirit and scope of the invention. The invention is not limited to those details and applications described except as set forth in the appended claims.

What is claimed is:

1. A windshield cleaning device adapted for attachment to a windshield wiper which comprises a tubular cleaning element having two ends, an adapter at each such end sized to fit securely to the cleaning element, at least one of such adapters being removable, each adapter having an opening therein, and a pair of holding arms, each arm having means thereon for securing it to the windshield wiper and each having an end of a shape for fitting into the respective openings in the ends of the adapters, thereby to hold the cleaning element in windshield cleaning position with respect to the wiper.

2. A windshield cleaning device according to claim 1 wherein said adapters are plugs shaped to frictionally fit securely into the ends of the tubular cleaning element, which ends are hollow, and which adapters have openings therein which conform to the cross-sectional shapes of the holding arm ends.

3. A windshield cleaning device according to claim 2 wherein the openings in the plugs provide a multiplicity of positions into which the ends of the holding arms can be fitted.

4. A windshield cleaning device according to claim 3 wherein said holding arms are in the form of straps or bars having half twists between the ends at which the terminal adapters are engaged and the ends secured to the wiper blade, which half twists provide spring actions to press the tubular cleaning element against a windshield surface when the windshield wiper blade and windshield cleaning device are applied thereto.

5. A windshield cleaning device according to claim 4 wherein the ends of the holding arms are secured to the wiper blade by means of spring clamps.

6. A windshield cleaning device according to claim 5 wherein at least an outer surface of said cleaning element comprises a plastic mesh material.

7. A windshield cleaning device according to claim 6 wherein the openings in the plugs are two slots in each, crossing at right angles, each slot conforming in shape to the end cross-sectional shape of a holding arm, thereby providing four positions into which the holding arms can be fitted with respect to the plug and four positions in which the cleaning device mesh surface can be held against a windshield.

8. A windshield cleaning device according to claim 1 which comprises a flexible tubular cleaning element having a terminal adapter plug inserted in each end, each terminal adapter plug being joined to an end of a holding arm, the other ends of the holding arms being attachable to a windshield wiper blade by means of a pair of spring clamps which hold the tubular cleaning element in a position substantially parallel to the wiper blade when attached, each holding arm being joined to its plug by insertion into an opening therein, and the openings in the plugs being so shaped as to provide a multiplicity of positions in each into which the holding arms may be inserted to form a secure fit between the holding arms and the plugs and to hold the tubular cleaning element against the windshield when the wiper is held against it.

9. A windshield cleaning device according to claim 8 wherein a substantial proportion of the cleaning element is of transparent plastic.

10. A windshield cleaning device according to claim 8 wherein the flexible tubular cleaning element and the adapter plugs are of transparent synthetic organic polymeric plastic material(s).

11. A windshield cleaning device according to claim 1 which comprises means for holding the tubular cleaning element onto the arms by means of the adapters in any of a multiplicity of desired cleaning positions.

12. A windshield cleaning device according to claim 1 wherein the holding arms are each in strap or bar form, having half twists between the ends at which the terminal adapters are engaged and the ends secured to the wiper blade, which half twists provide spring actions to press the tubular cleaning element against the windshield surface when the windshield wiper blade and windshield cleaning device are in contact therewith.

* * * * *